United States Patent [19] [11] 4,079,370
Mikoshiba et al. [45] Mar. 14, 1978

[54] METHOD OF DRIVING A FLAT DISCHARGE PANEL

[75] Inventors: Shigeo Mikoshiba, Tokyo; Shinichi Shindada, Kokubunji, both of Japan

[73] Assignee: Hitachi, Ltd., Japan

[21] Appl. No.: 725,629

[22] Filed: Sep. 22, 1976

[30] Foreign Application Priority Data

Sep. 22, 1975 Japan ............................... 50-113686

[51] Int. Cl.[2] ............................................... G06F 3/14
[52] U.S. Cl. ............................... 340/324 M; 313/220; 313/484; 315/169 TV; 340/343
[58] Field of Search .......................... 315/169 TV, 58; 313/220, 484; 340/324 M, 343, 173 PL

[56] References Cited

U.S. PATENT DOCUMENTS

| | | | |
|---|---|---|---|
| 3,873,870 | 3/1975 | Fukushima et al. | 313/220 |
| 3,876,906 | 4/1975 | Walters | 313/220 |
| 3,886,395 | 5/1975 | Fukushima et al. | 313/220 |
| 3,899,636 | 8/1975 | Chodil | 313/220 |

*Primary Examiner*—Marshall M. Curtis
*Attorney, Agent, or Firm*—Craig & Antonelli

[57] ABSTRACT

In a flat discharge panel having a cathode adapted to perform a discharge in cooperation with an anode through a main discharge space, being applied with a discharge voltage, and adapted to perform another discharge in cooperation with an auxiliary anode through an auxiliary discharge space, being applied with an auxiliary discharge voltage, said cathode being connected in series to a resistor, a method of driving the flat discharge panel characterized in that a memory function or characteristics is imparted to a matrix panel consisting of the flat discharge panel by shifting the discharge from the auxiliary discharge space to the main discharge space through raising the voltage applied to the main discharge space while lowering the voltage applied to the auxiliary discharge space, and by shifting the discharge from the main discharge space to the auxiliary discharge space by raising the voltage applied to the auxiliary discharge space while lowering the voltage applied to the main discharge space.

5 Claims, 16 Drawing Figures

METHOD OF DRIVING A FLAT DISCHARGE PANEL

BACKGROUND OF THE INVENTION

1. Field of the Invention

The present invention relates to a method of driving a flat discharge panel capable of displaying information in the form of numerals, letters and images utilizing D.C. gas discharging and, more particularly, to a method which enables the flat discharge panel to perform a memory function.

2. Description of the Prior Arts

Conventionally, there have been opposed a variety of flat discharge panels capable of performing a memory function; some of these are typically, as follows:

(1) A.C. plasma panel (H. J. Hohen and R. A. Martel, IEEE Trans. Electron Devices, vol. ED-18, No. 9, p659, 1971); (2) D.C. memory panel with resistors (J. Smith, IEEE Trans. Electron Devices, vol. ED-20, No. 11, p1103, 1973); (3) Abnormal-glow D.C. memory panel (J. Smith and K. E. Johnson, 1974 Conf. Display Devices and systems, P110, 1974);

(4) Pulsed gas-discharged panel with memory (G. E. Holz, Symp. Soc. Information Display, Digest Papers, P36, 1972), (C.D. Lusting, et al, Symp. Soc. Information Display, Digest Papers, P128, 1974);

(5) Electron-acceleration type discharge panel

These conventional methods have, however, suffered from the following disadvantages, respectively.

The method which employs the discharge panel of the above referenced item (1) utilizes the polarity of the wall charge for performing the memory function and is capable of providing a color display only with difficulty. In addition, an unacceptably large power loss is caused by capacitive current in this device.

In the method provided by the above-referenced item (2), ballast resistors are connected in series to respective discharge display elements so that the memory function is performed by the differential between the break down voltage and the extinction voltage of the gas discharge. The memory margin is inevitably small due to the fluctuation in the ballast resistor, and the switching speed is low. In addition, the use of a negative glow lowers the luminous efficiency. Difference in luminous efficiency between the halfselect discharge cell and the non-selective discharge cell deteriorates the display performance.

The method of the above-referenced item (3) also depends on the difference between the break down voltage and the extinction voltage of the gas discharge in obtaining the memory characteristics, but maintains a high level of discharge voltage by selecting and adjusting the cathode material and the charging gas. The high discharge voltage results in a reduced efficiency. At the same time, it is pointed out that the discharge voltage and current fluctuate largely, and the switching speed is unacceptably low. The difference in the luminance between the half-select and non-select discharge cells is also evidenced in this method.

In the method of above-referenced item (4), the memory characteristics depend on a phenomenon in which the break down voltage of a pulse varies in accordance with the presence of a space charge generated by a preceding pulse. The use of pulse discharge inevitably lowers the efficiency and the range of operational margin in made narrower. In addition, A more complicated structure is required for performing the pulse discharge.

The method of the above-referenced item (5) owes its memory characteristics to a control of the space charge which is effected by optionally changing the phase-differential between main and auxiliary power pulses. In this method, a large power loss is incurred by the use of the auxiliary discharge power and the efficiency is lowered accordingly. A complicated structure is required and the power source is impractically restricted. Summary of the Invention It is therefore an object of the invention to overcome the above described shortcomings of the prior art by providing a method of driving a flat discharge panel in which the discharge takes place only at either one of a main or an auxiliary discharging space to realize the memory function or characteristics.

According to the invention, there is provided a method in which a matrix panel having a discharge cell consisting of an X-axis anode, a Y-axis auxiliary anode and respectively cathodes which are connected in series by respective resistors is operated in such a manner that the voltages applied between the anode and the associated cathode and between the auxiliary anode and its cathode are reversed.

Other objects and advantageous features of the invention will become clear from the following description taken in conjunction with the attached drawings.

DESCRIPTION OF THE PREFERRED EMBODIMENTS

Figure 1:
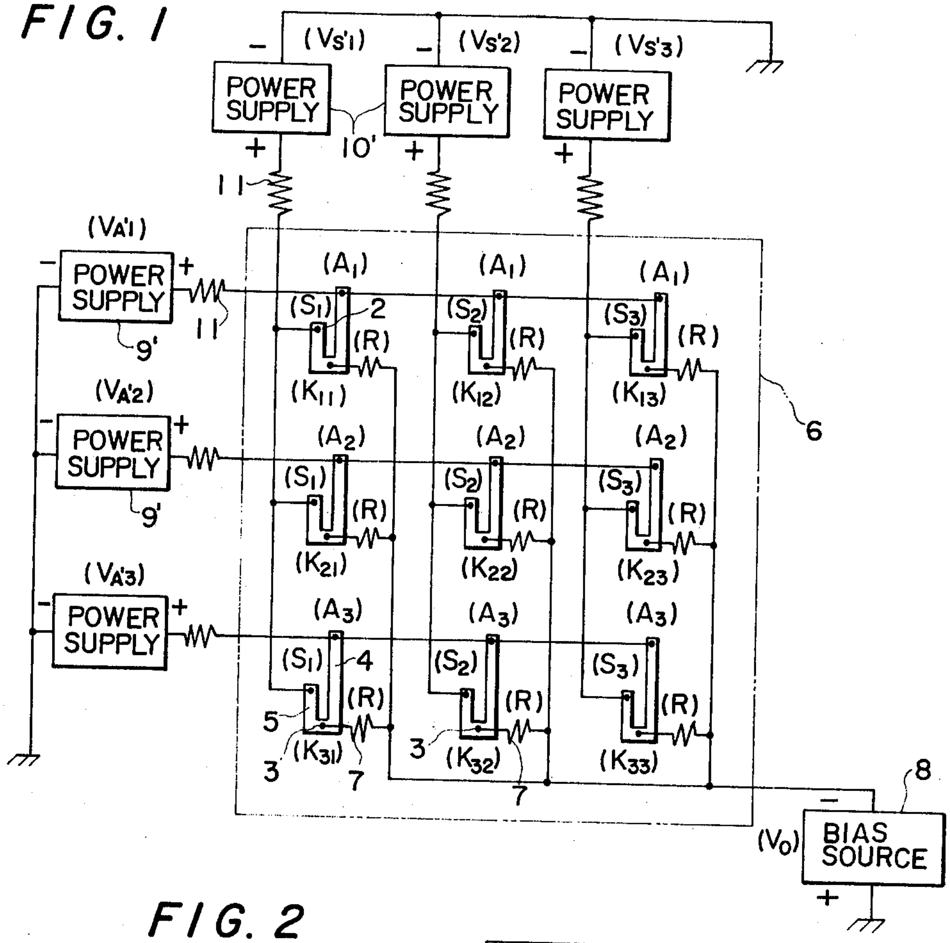
FIG. 1 is a schematic diagram of a flat discharge panel constructed to form a matrix and is used for explaining the driving method in accordance with the present invention.
Figure 2:
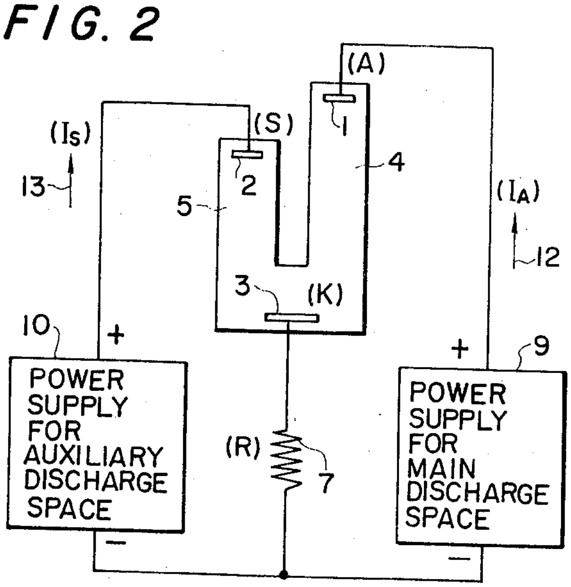
FIG. 2 is a diagram of an equivalent circuit of a discharge cell constituting the flat discharge panel.

FIG. 1 shows the basic structure of a flat discharge panel incorporating a plurality of discharge cells, one of which is shown by way of example in FIG. 2. The structures of FIGS. 1 and 2 in which the discharge takes place in parallel with the panel surface are given for purposes of explanation only and are not intended to limit the scope of the invention.

Referring to FIGS. 1 and 2, the panel includes an anode (X electrode) 1, an auxiliary anode (Y electrode) 2, a cathode 3, a main discharge space 4, an auxiliary discharge space 5, a matrix panel 6, a resistor 7 connected in series to the cathode 3 and a bias source 8. A power supply 9 for the main discharge is composed of the bias source 8 and an auxiliary power supply 9' for main discharge. A power supply 10 for the auxiliary discharge space consists of the bias source 8 and an auxiliary power supply 10'. Reference numerals 11, 12 and 13 designate, respectively, external resistors for preventing arc generation, a main discharge current and an auxiliary discharge current.

For the purpose of clarification, hereinafter, the anode 1, the auxiliary anode 2 and the cathode 3 will be referred to as a display discharge anode A, an auxiliary discharge anode S and a common cathode K, respectively. The main discharge space 4 will be called a display discharge space. The value of the resistor 7 will be represented by R, the voltage of the bias source 8 will be represented by Vo, the voltages of the power supplies 9 and 9' will be represented by VA and VA', respectively, while the voltages of power supplies for the auxiliary discharge space will be represented by VS and VS', respectively. Also, the main and auxiliary discharge currents will be represented respectively by IA and IS.

Since the main display discharge (between A and K) and the auxiliary display discharge (between S and K) commonly employ the resistor R, the discharge exists in only one of the display and the auxiliary spaces. A memory margin is given by the difference between the voltage pair ($V_A$, $V_S$) for forcing the discharge into the display discharge space from the auxiliary space and the voltage pair ($V_A$, $V_S$) for forcing the discharge into the auxiliary space from the display discharge space, i.e. the difference in discharge-shifting voltages.

In more detail, referring to FIG. 2, supposing that the auxiliary discharge is on (represented by "IS on") and the display discharge is off (represented by "IA off"), the voltages between S and K (V(S-K)) and between A and K (V(A-K)) are given by the following equations of:

$$V(S\text{-}K) = V_{sm} = V_s - I_s R \quad (1)$$

$$V(A\text{-}K) = V_A - I_s R = V_A - V_s + V_{sm} \quad (2)$$

where, $V_{sm}$ is an auxiliary discharging maintenance voltage. The motion point for this voltage is given at *a* in FIG. 3.

As the voltage $V_A$ increases, while the voltage $V_s$ is kept constant, V(A-K) comes equal to a break over voltage for the display $V_{Abd}$ at the time of IS on, so that the discharge is shifted from S-K to A-K. The voltage $V_A$ at this moment $V_A$(on) is given by the following equation from the above equation (2).

$$V_A(\text{on}) = V_s + (V_{abd} - V_{sm}) \quad (3)$$

Figure 3:
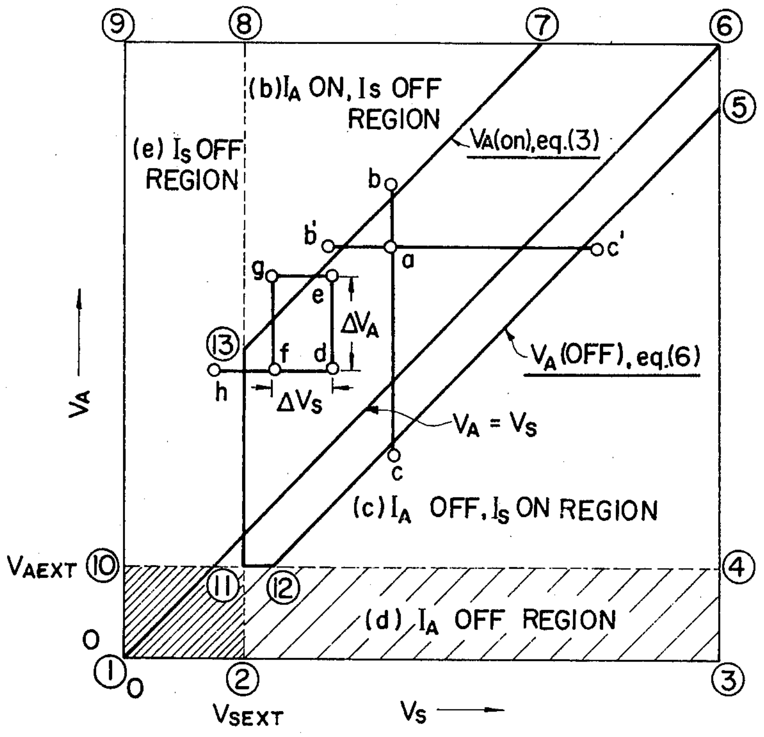
FIG. 3 is a graphical representation showing the manner in which the discharge panel is driven by the method of the present invention.

The voltage $V_A$ (on) is given at *b* in FIG. 3, and is shown in FIG. 3 as a function of $V_s$.

As the display discharge is turned on while the auxiliary discharge turns off, the following equations are obtained, supposing that the display discharge maintaining voltage is given by $V_{AM}$.

$$V(A\text{-}K) = V_{Am} = V_A - I_A R \quad (4)$$

$$V(S\text{-}K) = V_s - I_{AR} = V_s - V_A + V_{Am} \quad (5)$$

(Points *b* and *a* in FIG. 3, respectively)

To the contrary, as the voltage $V_A$ is lowered while $V_s$ is kept constant, the discharge will be shifted, when the voltage V(S-K) comes to be equal to $V_{sbd}$, to between S and K. $V_{sbd}$ here denotes a break over voltage for the auxiliary discharge.

At this moment, the value of $V_A$, i.e. $V_A$ off is given by the following equation, from the equation (5).

$$V_A(\text{off}) = V_s - V_{sbd} - V_{Am}) \quad (6)$$

(point c in FIG. 3)

$V_A$(off) is shown in FIG. 3 as a function of $V_s$. In FIG. 3, the area designated at (*a*) and defined by⑤-⑥-⑦-⑬-⑪-⑫ is a bi-stable area where $I_A$ and $I_s$ may be equally on and off, while the area designated at (*b*) and defined by⑦-⑧-⑬ is an area of $I_A$ on and $I_s$ off. In the area (*c*) defined by④-⑤-⑫, $I_A$ is off and $I_s$ is on.

Supposing here that the display and the auxiliary discharges are made at normal glows, $V_{Abd}$, $V_{Am}$, $V_{sbd}$ and $V_{sm}$ are constant so that the equations (3) and (6) assume a line of slope 1 i.e. $x = y$.

It is to be noted that equations (3) and (6) do not include R and I, so that the memory function does not depend on the value of resistor R.

The memory margin M is defined here, on condition of a constant $V_s$, as follows.

$$M = \{V_A(\text{on}) - V_A(\text{off})\} / 1/2 V_A(\text{on}) \quad (7)$$

At the same time, the following equation is given by the equations (3) and (6).

$$V_A(\text{on}) - V_A(\text{off}) = (V_{Abd}> - V_{Am}) + (V_{sbd}> - V_{sm}) \quad (8)$$

M is always positive, since $V_{Abd}$ $V_{Am}$ and $V_{sbd}$ $V_{sm}$, respectively. In FIG. 3, the values of $V_A$(on) and $V_A$(-off) are related to $V_{Abd}$, $V_{Am}$, $V_{sbd}$ and $V_{sm}$, respectively, by the equation 8.

Since it is not recommended to make the voltage $V_{sbd}$ larger than $V_{Abd}$, for obtaining a good operation of the panel, supposing the the display and the auxiliary spaces have an identical shape and that the margin M is a function of $V_{sbd}$, M becomes maximum, and the equations (7) and (8) can be modified to as follows.

$$M = \frac{4}{1 + \frac{V_s}{(V_{Abd} - V_{Am})}} \quad (9)$$

Since $V_A$(off) is larger than zero, M will reach its maximum value, which is 2, when $V_{abd} - V_{Am}$ is sufficiently large, i.e. when the discharge is sufficiently thin and long. It is desirable to lower the voltage $V_{sm}$ when M is excessively large.

Having described the manner of operation when $V_A$ is changed with $V_s$ kept constant, it will be understood that the same effect, but A and S being replaced with each other in the above equations, can be obtained when $V_s$ is changed with $V_A$ kept constant. Namely, supposing that the panel is working at the point *a* of FIG. 3, the display discharge will be turned on when the voltage $V_s$ is lowered to *b'* with $V_A$ kept constant, and will be turned off as the voltage $V_s$ is raised to *c'*.

The display discharge and the auxiliary discharge are incompatible with each other, as will be seen from the following explanation.

Supposing here that both discharges are simultaneously on, the following equations will be presented.

$$V_A = V_{Am} + (I_A + I_S)R \quad (10)$$

$$V_s = V_{sm} + (I_A + I_S)R \quad (11)$$

Therefore, $$V_A - V_{Am} = V_s - V_{sm} \quad (12)$$

The equation (12) cannot exist, because $V_A$ and $V_s$ are variable, irrespective of each other, while $V_{Am}$ and $V_{sm}$ are constant.

The voltage V(S-K), soon after the display discharge is turned on and the auxiliary discharge is turned off is obtained by substituting the equation (6) to the equation (5).

$$V(S-K) = V_s - V_A(\text{on}) + V_{Am} = V_{sbd} - \{V_A(\text{on}) - V_A(\text{off})\} < V_{sbd} \quad (13)$$

Therefore, the auxiliary discharge can never be turned on any more.

Similarly, the voltage V(A−K) soon after the auxiliary discharge is turned on and the display discharge is turned off is obtained by substituting the equation (2) to the equation (3).

$$V(A-K) = V_A(\text{off}) - V_s + V_{sm} = V_{Abd} - \{V_A(\text{on}) - V_A(\text{off})\} < V_{Abd} \quad (14)$$

Thus, the display discharge can never be turned on any more.

In addition to the above described phenomenon, $I_A$ and $I_s$ can not become smaller than minimum discharge maintaining current $I_A$min and $I_s$min, which are defined by the shape of the discharge tubes and the nature of the gas filling the tubes.

Namely, representing the minimum supply voltage for maintaining the display discharge, neglecting the mutual action between the display and auxiliary discharges, by $V_{Aext}$, and the minimum supply voltage for maintaining the auxiliary discharge, neglecting the mutual action, by $V_s$ext, following equations are given.

$$V_A < V_{Aext} \equiv V_{Am} + I_{Am}R \quad (15)$$

$$V_s < V_{sext} \equiv V_{sm} + I_{sm}R \quad (16)$$

When the above equations are satisfied, the discharge or auxiliary discharge is turned off, irrespective of the other discharge. These equations correspond to the area (d) (1)-(3)-(4)-(10) and the area (e) (1)-(2)-(8)-(9), respectively. The voltage $V_{Aext}$, as well as the voltage $V_{sext}$, depends on the resistance R and fluctuates in accordance with the fluctuation of the later.

A panel is here supposed, as shown in FIG. 1, to have cells as shown in FIG. 2, commonly connected to form a matrix, with the display discharging anode and the auxiliary discharging anode extending horizontally and vertically, respectively.

It is assumed here that the following voltages are applied.

$$V_{A'1} + V_o = V_{A'2} + V_o = V_{A'3} + V_o \equiv V_A (> V_{Aext}) \quad (17)$$

$$V_{s'1} + V_o = V_{s'2} + V_o = V_{s'3} + V_o \equiv V_s (> V_{sext}) \quad (18)$$

As the auxiliary discharge is normally more facilitated than the display discharge, all of the auxiliary discharges are turned on, and the points of motion of all discharge display elements are settled at, for example, point d of FIG. 3, and the display discharge is kept off.

A definition is made here that the cell located in line *m* and column *n* is designated at $(A_m, S_n)$, and the display discharge anode, the auxiliary discharge anode and the common cathode respectively bears the symbols of FIG. 1. If it is desired to turn on the display discharge of the cell $(A_2, S_2)$, i.e. to address the cell $(A_s, S_2)$, $V_{A'2}$ is raised by $\Delta V_A$, while $V_{s'2}$ is lowered by $\Delta V_s$. Consequently, the point $(A_2, S_2)$ is shifted to the point g of FIG. 3 to come into the region of $I_A$ on. The cells of half-selecting conditions, $(A_2, S_1)$, $(A_2, S_3)$ are shifted to the point e, while the cells of also the half-selecting condition $(A_1, S_2)$, $(A_3, S_2)$ move to the point *f* and no change in discharge takes place. Cells $(A_1, S_1)$, $(A_1, S_3)$, $(A_3, S_1)$ and $(A_3, S_3)$ remains at the point *d.*

The conventional methods aforementioned in items (2) to (4) have a common drawback in that the intensity or liminance changes in accordance with the discharging current at the half-selected points, so that the image flows or trails in the direction parallel to the electrode. However, according to the invention, no change in the discharge current is caused by the half-selection in case of a TV display, if the display discharge anodes and the auxiliary anodes are connected horizontally and vertically, respectively, as shown in FIG. 1, because one halfselection is performed by the auxiliary discharge anode.

For the purpose of TV display, the adhering is made for each horizontal line running along the display discharge anode. Supposing that 6 addressings are made for one line, an image of 6 bits, i.e. 64 tone wedges, is obtained. Since no discharge is necessary after the completion of addressing of one line, before the commencement of the next addressing, the voltage $V_s$ may be lowered after the addressing, so that the motion point of the cell is shifted from the point d to h of FIG. 3, thereby to save power without affecting the discharge.

However, prior to the addressing of the same line, the point of motion must have been returned to d from h. The speed of this returning is considered within an order of several micro seconds (μ us). This is attributable to the fact that the preceding line which has been already turned on acts as a "source" or trigger. Thus, for the first line, it is necessary to provide a reset discharge adapted to act as a source or a trigger.

Figure 4:
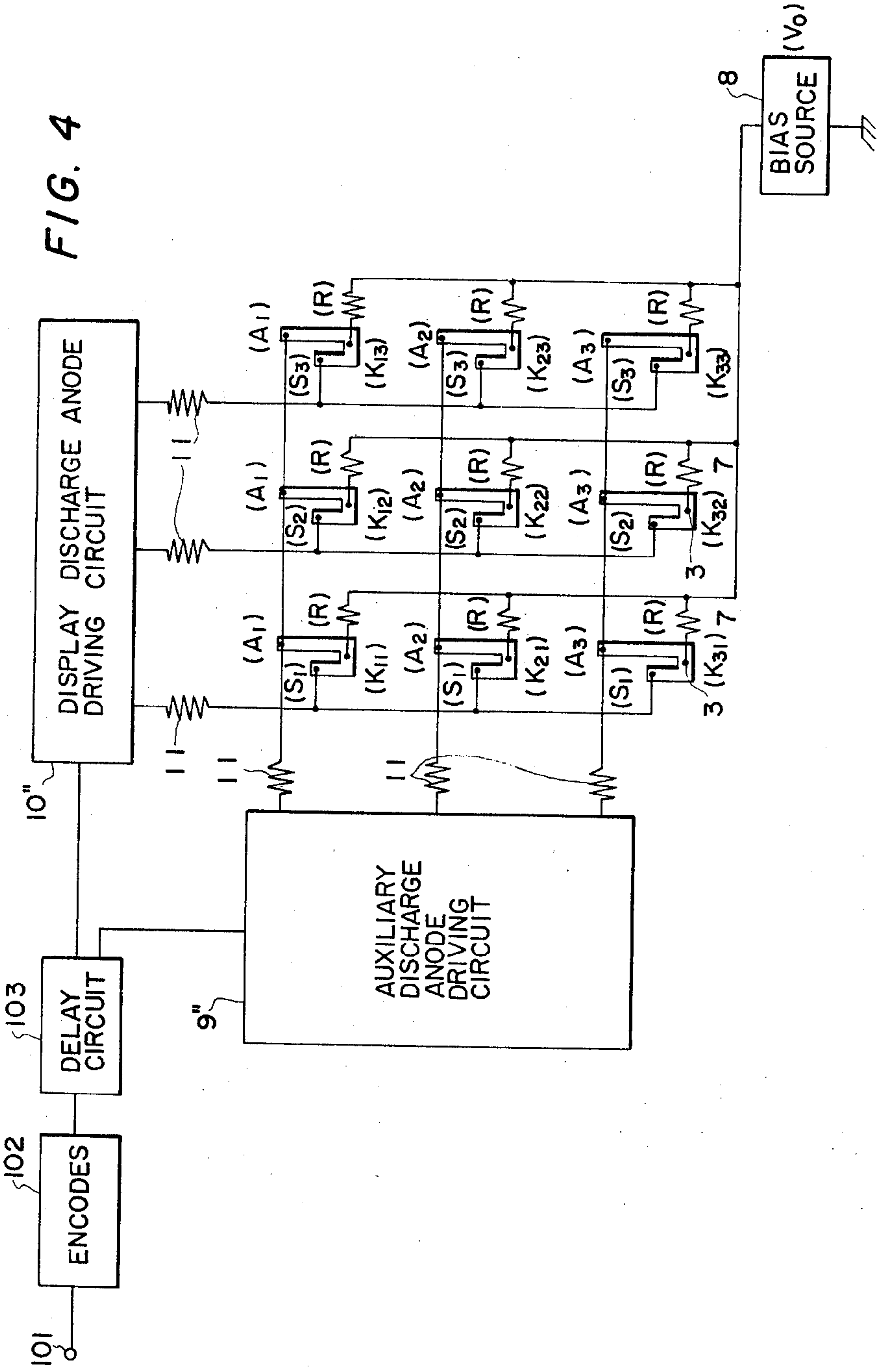
FIG. 4 is a diagram of driving means embodying the present invention.

FIG. 4 shows a construction of driving means for carrying out the method of the invention, in which the same numerals denote the same elements as FIG. 1. An input terminal 101 is adapted to receive an input in the form of an analogue signal as the usual TV signal or a coded digital signal. An encoder 102 is adapted to encode the analogue signals or digital signals into codes adapted of or the subsequent circuits. A convertor 103 is provided for converting the input signal into the duration of time of luminence. The convertor circuit 103 is necessary because the liminance of the discharge cell is determined by the duration of time the cell is on. The circuit 103 consists of delay circuits having a different delay time predetermined for respective digital inputs (i.e. the outputs from the encoder 102). Namely, the delay circuit 103 consists of a plurality of delaying means, such as a shift resistor, the number of stages of the shift registor being so selected as to provide the required delay time.

Thus, the delay circuit 103 determines the timings of the switching pulse voltages of $\Delta V_A$, $\Delta V_s$ adapted to be applied to the cells through the display discharge anode and the auxiliary anode, and delivers the signal representing the timings to a display discharge anode driving circuit 9″ and to an auxiliary discharge anode driving circuit 10″.

The circuit 9″ consists of a D.C. power source having voltages of $V_{A'1}$, $V_{A'2}$, $V_{A'3}$ and so on and a switching element adapted to superimpose the voltage $\Delta V_A$ on the D.C. source at a time ordered by the delay circuit 103, while the circuit 10″ consists of a D.C. power source having outputs of $V_{s'1}$, $V_{s'2}$, $V_{s'3}$ and so on and a switching element adapted to super-impose the voltage $\Delta V_s$ on the D.C. source at a time given by the delay circuit 103.

Figure 5A:
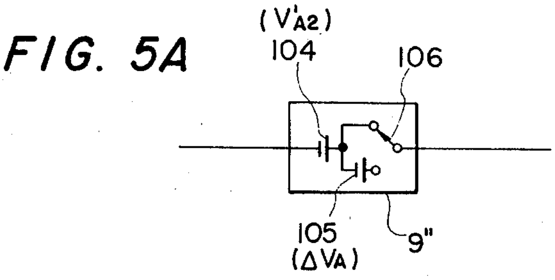
FIGS. 5A and 5B are illustrations explanatory of the means as shown in FIG. 4.
Figure 5B:
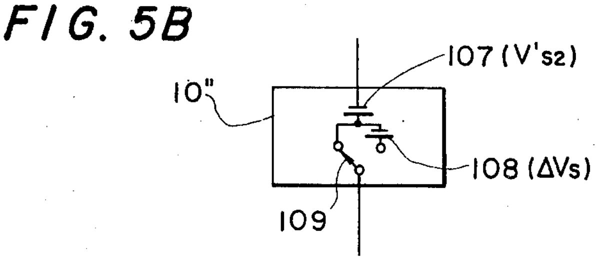

FIGS. 5A and 5B schematically show the driving circuits 9″ and 10″ for the display discharge anode and the auxiliary discharge anode, respectively. In those Figures, D.C. source 104, 107 respectively have outputs of, for example, $V_{A'2}$ and $V_{s'2}$, while D.C. source 105, 108 respectively have outputs of $\Delta V_A$ and $\Delta V_s$. Numerals 106, 109 designate switching elements, respectively, and adapted to be connected to the D.C. sources 105, 108, upon receipt of a signal from the delay circuit 103.

There are two kinds of cross talk, for the cells combined to form a matrix. The first one is an extraordinary discharge which does not pass the discharge space. This can be avoided by increasing the insulation between the cells. The second one takes place when a current flows in the following order which starts from the source 9′ and through the resistor 11, display discharge anode A1(A1, S1), common cathode K11, auxiliary discharge anode S1(A2, S1), common cathode K21, resistor 7, bias source 8 and then to the grounding terminal. A, S, K designate, respectively, a display discharge anode, an auxiliary anode, and a cathode, as aforementioned.

In this condition, elements S1(A1, S1) and S1(A2, S1) become cathodes, so that one of the display discharges $(A_1, S_1)$ and $(A_2, S_2)$ commences the discharge. This cross talk takes place when the difference between $V_A$ and $V_s$ is extraordinarily large which is less likely to occur when the display discharge space and the auxiliary discharge space have the same shape. At the same time, in FIG. 2, as the difference between $V_A$ and $V_s$ grows larger, a current flows from the source 9 to the source 10, through the display discharge anode 1, the common cathode 3, and the auxiliary discharge cathode 2. This current causes an arc since the auxiliary discharge anode acts as a cathode. The arcs, as well as the damage on the panel, due to this cross-talk can be avoided by inserting external resistors 11 in series to the sources 9′, 10′ and so on.

Since the display and the auxiliary discharges play the role of mutual trigger or source, the cross talks caused by the electrical charge leaked from the other discharge space, which are often found in conventional arrangement can hardly occur.

Figure 6:
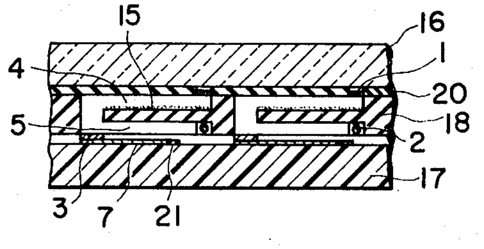
FIG. 6 is a sectional view of a flat discharge panel to which the driving method of the invention is applied.
Figure 7A:
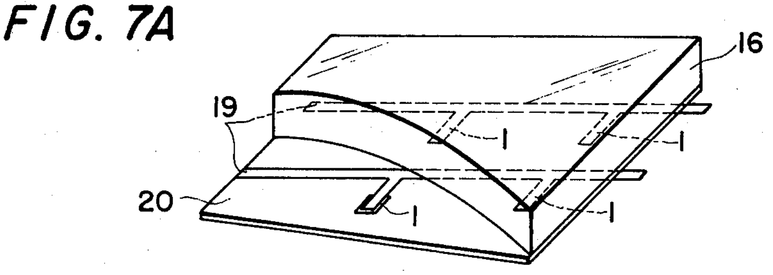
FIGS. 7A to 7C are perspective views of parts of the panel of FIG. 6.
Figure 7B:
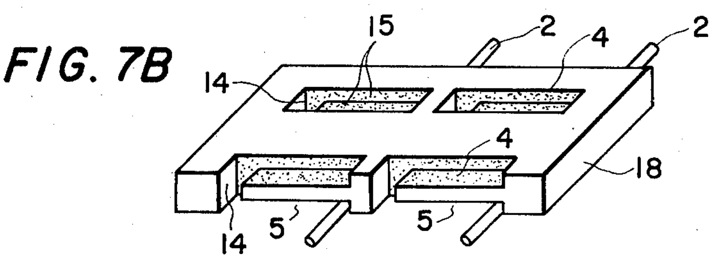
Figure 7C:
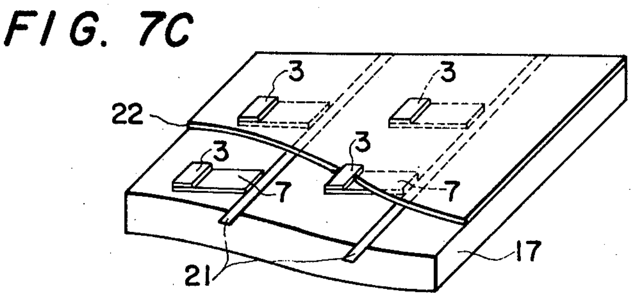

FIG. 6 shows in section a flat discharge panel of the type described in our copending U.S. application Ser. No. 723,608, to which the driving method of the invention can conveniently be applied, while FIGS. 7A to 7C are perspective views of essential parts of the panel of FIG. 6.

Referring now to those Figures, reference numerals 1, 2, 3, 4, 5 and 7 designate, similary to FIG. 1, a display discharge anode, an auxiliary discharge anode, a common cathode, a discharge space for display, an auxiliary discharge space and a resistor, respectively. The numeral 14 denotes a binding space, 15 denotes a fluorscent material applied to the wall of the display discharge space, 16 denotes a transparent insulative plate, 17 denotes an insulative substrate, 18 denotes an insulative plate, 19 designates a lead for the display discharge anode, 20 denotes a cover glass for the display discharge anode, 21 denotes a lead for the cathode, and the numeral 22 denotes a cathode cover glass.

The memory drive will be performed by applying a voltage to the plate of FIG. 6 connected in the manner as shown in FIGS. 1 and 2.

In the panel of FIG. 6, the display discharge space 4 has a breadth, depth and length of 0.25 mm, 0.23 mm and 1.5 mm, respectively, while the auxiliary discharge space 5 has a breadth, depth and length of 0.25 mm, 0.38 mm and 0.8 mm, respectively. The binding space 14 has a diameter of 0.3 mm, and a length of 0.5 mm. The cathode 3 is made of nickel and has a surface area of 0.2 $mm^2$. The gas used is xenon at a pressure of 33 Torr. The static characteristic of this panel is measured and shown in FIG. 8. Resistors of 1 MΩ, 2 MΩ or 5 MΩ are used as the resistor 7.

Figure 8:
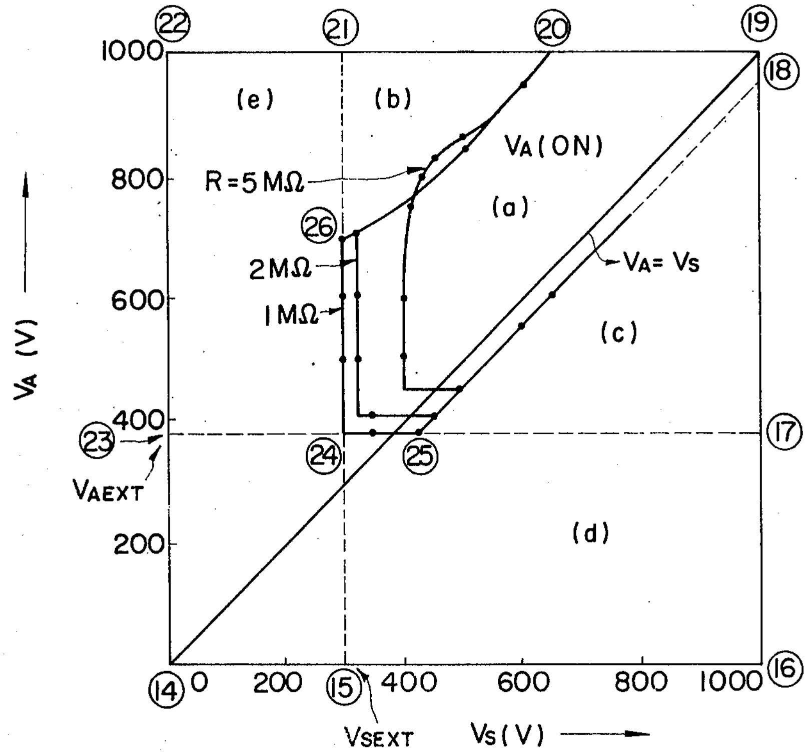
FIG. 8 is a graph showing a static characteristic of the panel of FIG. 6 when it is operated in accordance with the method of the present invention.

In FIG. 8, the space defined by numerals ㉔ - ㉕ ⑱ - ⑲ - ⑳ - ㉖ is denoted at (*a*), while the space encircled by numerals ⑳ - ㉑ - ㉖ is denoted by (*b*). Similarly, the space encircled by the numerals ⑰ - ⑱ - ㉕, ⑭ - ⑯ - ⑰ - ㉓, and ⑭ - ⑮ - ㉑ - ㉒ are respectively (*c*), (*d*) and (*e*). The regions (*a*) to (*e*) of FIG. 8 correspond to the regions (*a*) to (*e*) of FIG. 1, respectively.

It will be seen from FIG. 8, that no substantial changes occur in the values of $V_A$(on) and $V_A$(off), even when the resistance R is increased from 1 to 5 MΩ. This means that the fluctuation in the value of R does not materially affect the memory characteristics.

In contrast to the above, the values of $V_{Aext}$ and $V_{sext}$ vary in accordance with the change in R. Thus, in the conventional method as stated in the foregoing item (2), the fluctuation in R makes it difficult use a large matrix panel. However, in the method of the invention, $V_{Aext}$ and $V_{sext}$ are not used for providing the memory characteristics.

In measuring the characteristics of FIG. 8, the following conditions were given.

$$V_{Abd} = 700V,\ V_{Am} = 370V,\ V_{sed} = 420V,\ V_{sm} = 350V$$

Therefore, the equations (3), (6) and (8) are rewritten, respectively, as follows:

$$V_A(\text{on}) = V_s + 350 \text{ volt} \quad (3')$$

$$V_A(\text{off}) = V_s - 50 \text{ volt} \quad (6')$$

$$V_A(\text{on}) - V_A(\text{off}) = 400 \text{ volt} \quad (8')$$

Above equations well suit the curves in FIG. 8. The memory M margin given by the equation (7) is calculated to be 1, because the voltages $V_A$(on) and $V_A$(off) are 800V and 400V respectively, when R is 1 MΩ and $V_s$ is 450V. When the discharge switching is performed by $V_s$, M is 1.2, because $V_s$(on) and $V_s$(off) are 750V and 300V, respectively, when the resistance R and $V_A$ is 1 MΩ and the voltage 700V, respectively.

In general, the memory margin M of or greater than 0.5 is acceptable. Thus, the above value well satisfies this requirement. No other arrangement can provide such a large memory margin of 1.0 or higher.

In the driving method of the invention, the fluctuation in the resistance R appears as a fluctuation in the discharge current. Since the luminence of the fluorescent material linearly increases and then saturates as the current increases, the fluctuation of resistance R will cause the fluctuation of luminence when the panel is operated at a lower current range, while no substantial fluctuation in luminence will occur when the panel is operated at a higher current zone. However, the latter case would cause a deteriorated efficiency as compared with the former case.

Hereinafter, an explanation will be made as to the dynamic characteristics exhibited by the panel when it is switched by a pulsing voltage.

Figure 10:
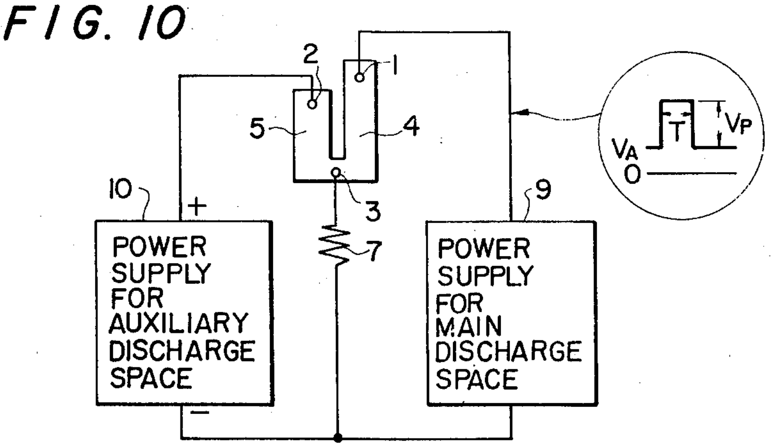
FIG. 10 shows a driving circuit employed in measuring the characteristics of FIGS. 9 and 11.
Figure 9:
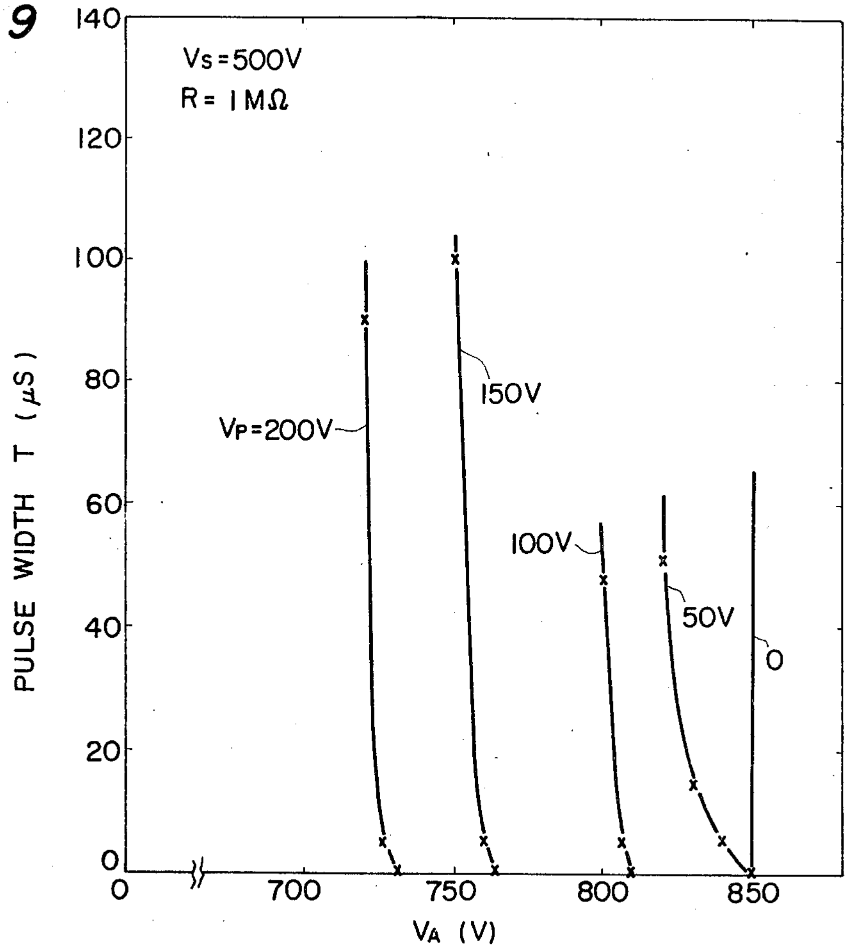
FIGS. 9 and 11 are graphs showing dynamical characteristics of the panel as shown in FIG. 6 when it is driven by pulses.

FIGS. 9 and 10 show the relationship between the pulse voltage $V_p$ and the pulse width T, required for switching the display discharge from off to on. For example, in order to turn the display discharge to on, by a pulse of 5 $\mu$ sec, when the auxiliary discharge is made at $V_A = 800V$ and $V_s = 500V$, a pulse voltage of 100V or higher is required. It is to be noted that the pulse width changes abruptly, with respect to the voltage $V_A$, which means that the switching is not so largely affected by the pulse width.

Figure 11:
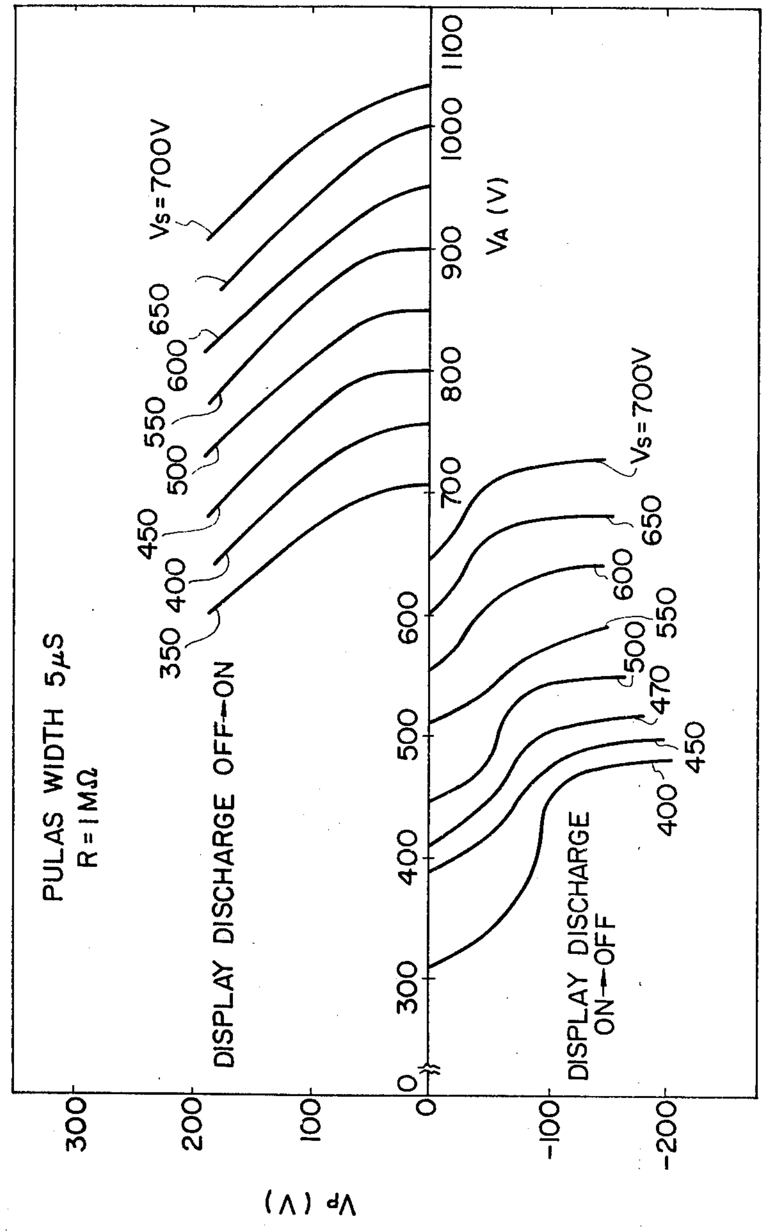

FIG. 11 shows the relationship between $V_p$ and $V_A$ required for the switching by a pulse of 5 $\mu$ sec, when the voltage $V_s$ in the circuit of FIG. 10 is kept constant.

In FIG. 11, the region of $V_p \geqq 0$ is for switching the display discharge from off to on, while the region of $V_p \leqq 0$ is for switching the display discharge from on to off. In the region of $V_p \geqq 0$, the voltage $V_p(V_A)$ can be represented approximately, for the range of $V_p > 50$ volt as follows.

$$V_p \simeq V_{Ao}(\text{on}) - V_A + 50 \text{ volt} \quad (19)$$

$V_{Ao}(\text{on})$ here represents the value of $V_A(\text{on})$ when the voltage $V_p$ is zero. The equation (19) shows that the voltage of the pulse width of 5 $\mu$ sec must be higher than that of of D.C., for causing the switching by that pulse.

To the contrary, in the region of $V_p \leqq 0$, for the range of $|V_p| < 50$ volt, $V_p(V_A)$ can be represented as follows.

$$V_p \simeq V_{Ao}(\text{off}) - V_A \quad (20)$$

Thus, no additional voltage is necessary. However, when the point $(V_A, V_s)$ for maintaining the discharge is located inwardly of the $V_A(\text{off})$ curve, more than 50V, it becomes very difficult to switch the display discharge off.

Figure 13:
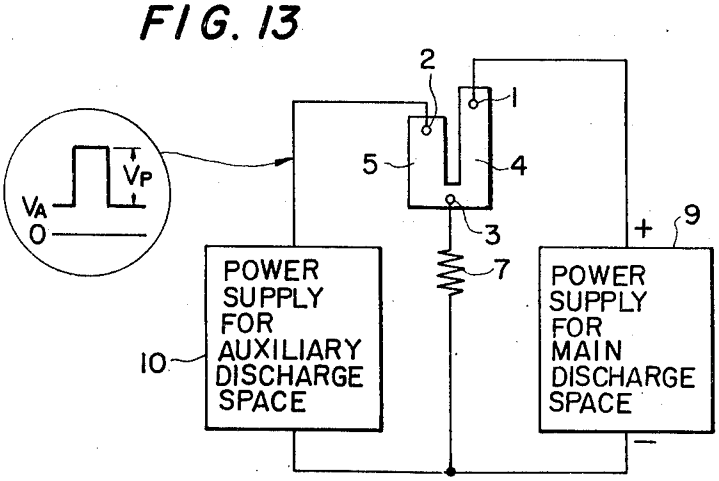
FIG. 13 shows a driving circuit employed in measuring characteristic of FIG. 12.
Figure 12:
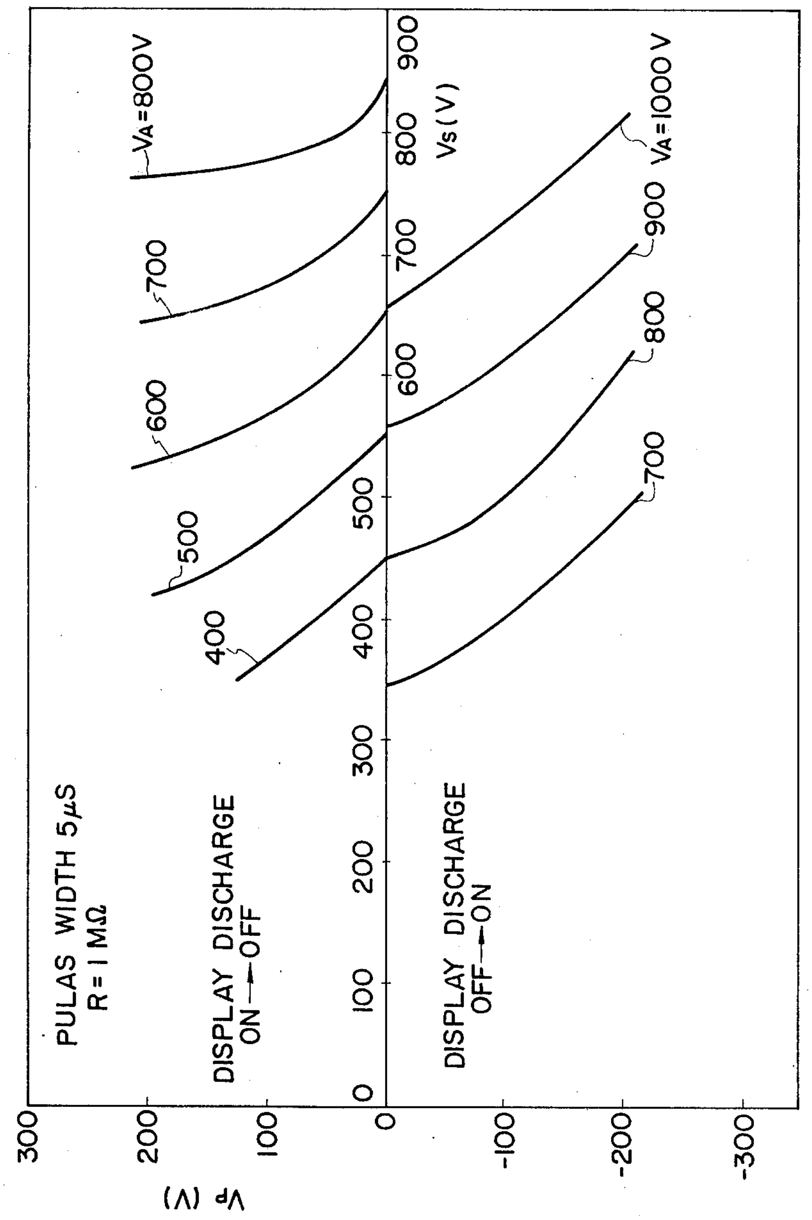
FIG. 12 shows another characteristic measured at a condition different from that of FIGS. 9 and 11.

FIG. 12 shows the values of $V_p$ required for the switching, when $V_s$ is varied and $V_A$ is kept constant in the circuit of FIG. 13. The pulse width employed for the switching is 5 $\mu$ sec. The regions of $V_p \leqq 20$ and $V_p \geqq 0$ respectively for turning the display discharge off and on, and thus correspond to those of FIG. 11.

The above description is for such a case that the panel of FIG. 6 is used in carrying out the method of the invention. However, the present invention can be equally well performed employing a panel which comprises a shorter auxiliary discharge space, as compared with that of FIG. 6, and disposed perpendicular to the transparent insulative plate 16 and a negative glow for the auxiliary discharge. At the same time, the fluorescent material 15 may be substituted by such gases as neon or argon filled in the panel, for emitting visible light.

The advantageous features of the invention as described above can be summarized as follows.

(1) Only one resistor is necessary for both of the display and auxiliary discharges.

(2) Memory margin is substantially free from the change in the resistance of the resistor 7.

(3) Substantially constant intensity or luminence is obtained, even if the change in resistance of the resistor takes place to cause the change in discharge current, when the panel is operated at a region where the discharge current saturates.

(4) An extremely high memory margin exceeding 1 can be obtained by employing a discharge having a high break over voltage such as positive column.

(5) When the positive column is used, a higher luminence efficiency and reduced deterioration of intensity are simultaneously obtained.

(6) The power is saved considerably, since one discharge is stopped when the other discharge is carried on.

(7) Since the display and the auxiliary discharges primming discharges for each other to initiate the discharge fluctuation of $V_A(\text{on})$ and $V_A(\text{off})$ is less likely to occur.

(8) IC circuit may be used as the switching element, since the voltage required for the switching is sufficiently low, irrespective of the discharge maintaining voltage.

(9) A high speed switching below 5 $\mu$ sec is obtainable and can be adopted in a TV display.

(10) Since random accesses to the display discharge elements are possible, data display at the terminals of a computer is possible.

(11) Less likely to be affected by the pulse width when the switching is made by pulses.

(12) No change in display luminence takes place, which is caused by a change in the current at the half-select point.

(13) The auxiliary discharge may be suspended, when it is not necessary, without affecting the display discharge.

(14) In switching the auxiliary discharge on, from the condition of both discharges being off, an auxiliary discharge of the preceding stage can be utilized as the primming or trigger discharge so that the time of rising up of the discharge is shortened.

(15) Similarly to the above item (14), when the auxiliary discharge is to be turned on, from the condition of both discharges being off, the rising up time can be shortened by adoption of a specially adapted primming discharge for the auxiliary discharge.

(16) The gray tone of the display color can be obtained by controlling the discharge current or on-period.

We claim:

1. A method of driving a flat discharge display panel of the type having a plurality of gas discharge cells arrived in a matrix form, each of said cells comprising a main anode electrode, an auxiliary anode electrode and a cathode electrode interposed between said main anode electrode and said auxiliary anode electrode, a main discharge space being provided between said main anode electrode and said cathode electrode, an auxiliary discharge spacing being provided between said auxiliary anode electrode and said cathode electrode, said main and auxiliary discharge spaces being in communication with each other, and a gas contained in said main and auxiliary discharge spaces, said method comprising the steps of:

(a) applying a first D.C. voltage between said auxiliary anode electrode and said cathode electrode and a second D.C. voltage between said main anode electrode and said cathode electrode; and (b) increasing one of said first and second D.C. voltages while decreasing the other to switch between a main discharge being generated in said main discharge space with internal memory function and an auxiliary discharge being generated in said auxiliary discharge space.

2. A method of driving a flat discharge display panel having a plurality of gas discharge cells arrayed in a matrix form, each of said cells comprising a cathode electrode, an auxiliary anode electrode serving as an X-axis electrode, a main anode electrode serving as a Y-axis electrode disposed on the opposite side of said cathode electrode from said auxiliary anode electrode, a main discharge space being provided between said main anode electrode and said cathode electrode, an auxiliary discharge space being provided between said auxiliary anode electrode and said cathode electrode, and a resistor connected between said cathode electrode and one terminal of a bias source, the other terminal of said bias source being connected to ground; said method comprising the steps of:

(a) applying a first D.C. voltage to the main anode electrode and a second D.C. voltage to the auxiliary anode electrode of a select discharge cell, said first and second D.C. voltages having values larger than voltage values at which the main discharge is formed between the main anode electrode and the cathode electrode of said selected discharge cell;

(b) reducing said first D.C. voltage to half-select said discharge cell, said first D.C. voltage then having a value smaller than the voltage value at which the main discharge is formed between the main anode electrode and the cathode electrode of said half-select discharge cell; and (c) increasing said second D.C. voltage to non-select said discharge cell, said second D.C. voltage then having a value which is lower than the voltage value enabling the discharge between the main anode electrode and the cathode electrode and is higher than the voltage value to disable the discharge between the main anode electrode and the cathode electrode, so that said main discharge maintains a memory function.

3. A method of driving a flat discharge display panel having a plurality of gas discharge cells arrayed in a matrix form, each of said cells comprising a cathode electrode, an auxiliary anode electrode serving as an X-axis electrode, a main anode electrode serving as a Y-axis electrode disposed on the opposite side of said cathode electrode from said auxiliary anode electrode, a main discharge space being provided between said main anode electrode and said cathode electrode, an auxiliary discharge space being provided between said auxiliary anode electrode and said cathode electrode, and a resistor connected between said cathode electrode and one terminal of a bias source, the other terminal of said bias source being connected to ground, said method comprising the steps of:

(a) applying a first D.C. voltage to the main anode electrode and a second D.C. voltage to the auxiliary anode electrode of a select discharge cell, said first and second D.C. voltages having values larger than the voltage values at which the main discharge is extinguished between the main anode electrode and the cathode electrode of said address discharge cell;

(b) reducing said first D.C. voltage to half-select said discharge cell, said first D.C. voltage then having a value smaller than the voltage value at which the main discharge is extinguished between the main anode electrode and the cathode electrode of said half-select discharge cell; and (c) increasing said second D.C. voltage to non-select said discharge cell, said second D.C. voltage then having a value which is lower than the voltage value enabling the discharge between the main anode electrode and the cathode electrode and is higher than a voltage value to disable the discharge between the main anode electrode and the cathode electrode, so that said main discharge maintains a memory function.

4. A method of driving a flat discharge display panel having a plurality of gas discharge cells arrayed in a matrix form, each of said cells comprising a cathode electrode, an auxiliary anode electrode serving as an X-axis electrode, a main anode electrode serving as a Y-axis electrode disposed on the opposite side of said cathode electrode from said auxiliary anode electrode, a main discharge space being provided between said main anode electrode and said cathode electrode, an auxiliary discharge space being provided between said auxiliary anode electrode and said cathode electrode, and a resistor connected between said cathode electrode and one terminal of a bias source, the other terminal of said bias source being connected to ground; same method comprising the steps of:

(a) applying a first D.C. voltage to the main electrode and a second D.C. voltage to the auxiliary anode electrode of a select discharge cell, said first and second D.C. voltages having values larger than voltage values at which the main discharge is formed between the main anode electrode and the cathode electrode of said selected discharge cell;

(b) increasing said second D.C. voltage to half-select said discharge cell, said second D.C. voltage then having a value smaller than the voltage value at which the main discharge is formed between the main anode electrode and the cathode electrode of said half-select discharge cell; and (c) decreasing said first D.C. voltage to non-select said discharge cell, said first D.C. voltage then having a value which is lower than the voltage value enabling the discharge between the main anode electrode and the cathode electrode and is higher than the voltage value to disable the discharge between the main anode electrode and the cathode electrode, so that said main discharge maintains a memory function.

5. A method of driving a flat discharge display panel having a plurality of gas discharge cells arrayed in a matrix form, each of said cells comprising a cathode electrode, an auxiliary anode electrode serving as an X-axis electrode, a main anode electrode serving as a Y-axis electrode disposed on the opposite side of said cathode electrode from said auxiliary anode electrode, a main discharge space being provided between said main anode electrode and said cathode electrode, an auxiliary discharge space being provided between said auxiliary anode electrode and said cathode electrode, and a resistor connected between said cathode electrode and one terminal of a bias source, the other terminal of said bias source being connected to ground; said method comprising the steps of:

(a) applying a first D.C. voltage to the main anode electrode and a second D.C. voltage to the auxiliary anode electrode of a select dischharge cell, said first and second D.C. voltages having values larger than the voltage values at which the main discharge is extinguished between the main anode electrode and the cathode electrode of said address discharge cell;

(b) increasing said second D.C. voltage to half-select said discharge cell, said second D.C. voltage then having a value smaller than the voltage value at which the main discharge is extinguished between the main anode electrode and the cathode electrode of said half-select discharge cell; and (c) reducing said first D.C. voltage to non-select said discharge cell, said first D.C. voltage then having a value which is lower than the voltage value enabling the discharge between the main anode electrode and the cathode electrode and is higher than a voltage value to disable the discharge between the main anode electrode and the cathode electrode, so that said main discharge maintains a memory function.

* * * * *